United States Patent [19]

Bouldin

[11] Patent Number: 4,666,060
[45] Date of Patent: May 19, 1987

[54] POT DISPENSING APPARATUS

[75] Inventor: Floyd E. Bouldin, McMinnville, Tenn.

[73] Assignee: Bouldin & Lawson, Inc., McMinnville, Tenn.

[21] Appl. No.: 829,520

[22] Filed: Feb. 14, 1986

[51] Int. Cl.4 .............................................. B65G 59/06
[52] U.S. Cl. ..................................... 221/11; 221/106; 221/108; 221/222; 221/241
[58] Field of Search .................. 221/11, 104, 106–108, 221/221–223, 297, 241–242

[56] References Cited

U.S. PATENT DOCUMENTS

| | | | |
|---|---|---|---|
| 1,634,566 | 7/1927 | Wessman. | |
| 2,445,958 | 7/1948 | Lindstrom | 221/242 X |
| 3,071,775 | 1/1963 | Strout | 221/241 X |
| 3,426,941 | 2/1969 | Houekamp | 221/222 |
| 3,712,483 | 1/1973 | Messervey | 221/222 X |
| 3,862,702 | 1/1975 | Johnson et al. | 221/222 X |
| 4,418,837 | 12/1983 | Kontz | 221/222 |
| 4,426,017 | 1/1984 | Ficken et al. | 221/222 |
| 4,529,101 | 7/1985 | Orlowski | 221/223 X |

FOREIGN PATENT DOCUMENTS 2519183 11/1976 Fed. Rep. of Germany ...... 221/221
2740921  9/1977 Fed. Rep. of Germany.

Primary Examiner—Charles A. Marmor
Attorney, Agent, or Firm—Harrington A. Lackey

[57] ABSTRACT

An apparatus for dispensing frusto-conical pots, such as nursery or plant pots, including a pair of pivotally connected arm members arranged for movement toward and away from each other on opposite sides of a stack of pots to be dispensed. Each arm member, or each set of arm members, supports a plurality of feed cylinders, each having a spiral groove in its cylindrical surface, adapted to engage opposite sides of the stack of pots and adapted to be rotated in a direction to cause the lowermost pot or pots to separate and drop from the upper pots in the stack. An adjustment mechanism is included for moving the arm members toward and away from each other in order to accommodate stacked pots of different diameters. An overhead conveyor may be provided for feeding stacks of pots to the dispensing position between the arm members.

9 Claims, 10 Drawing Figures

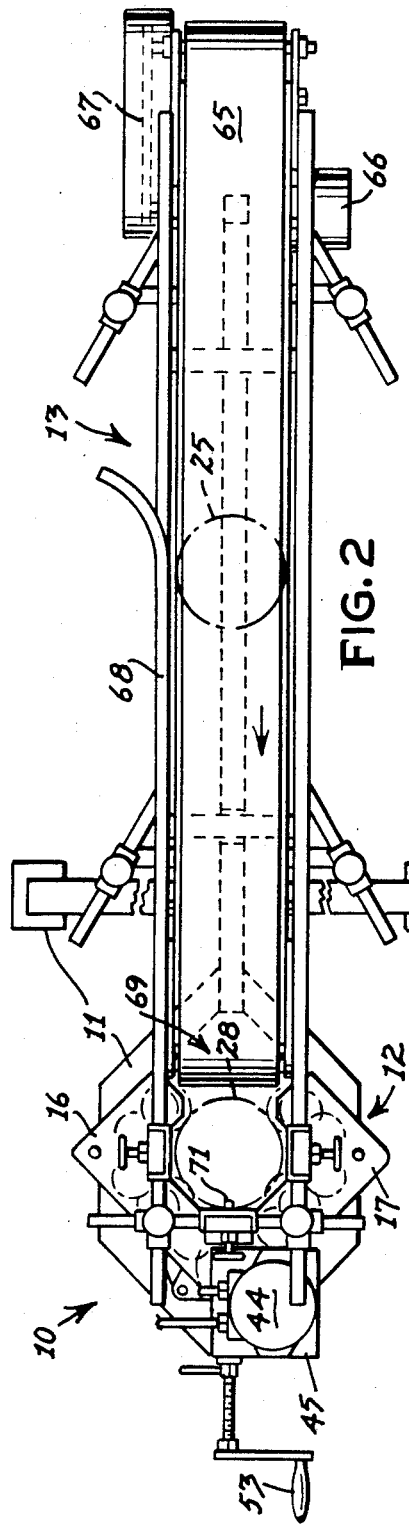
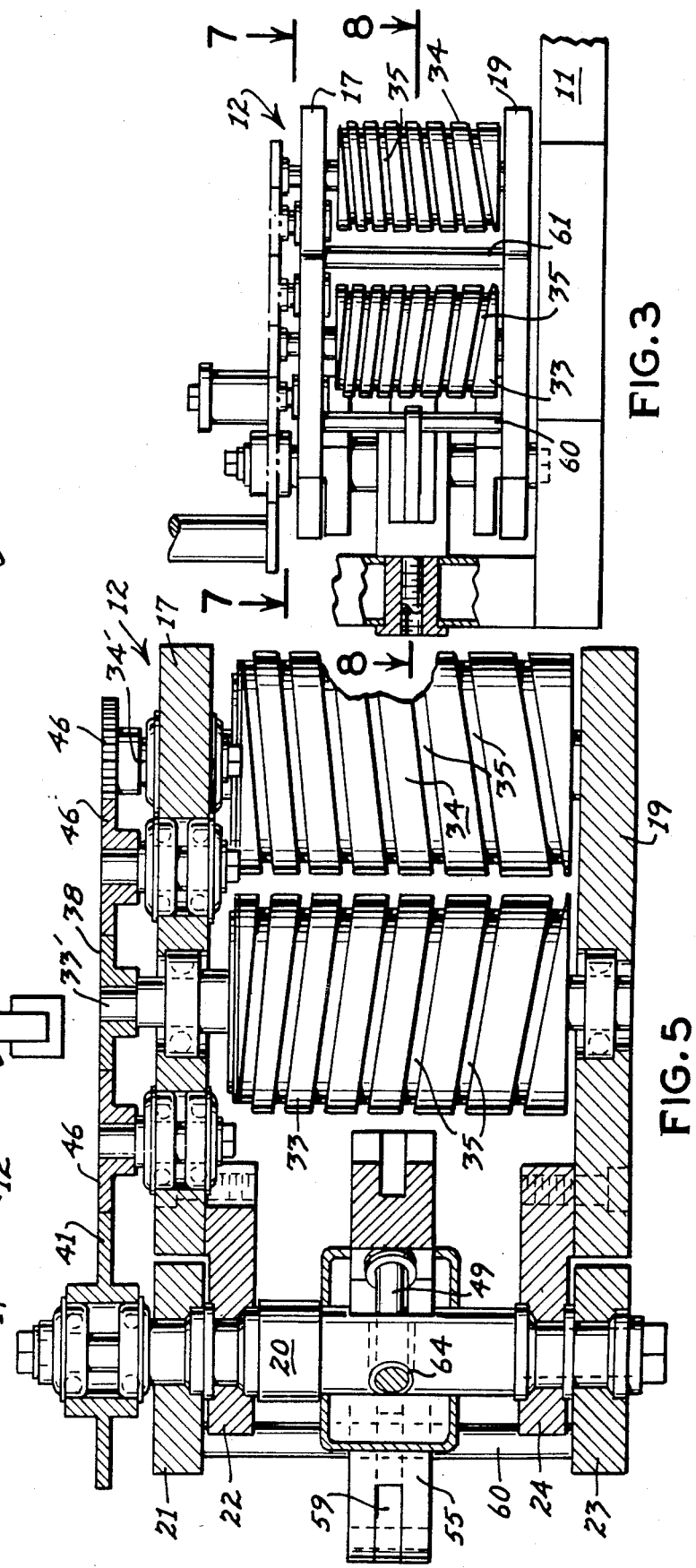
FIG. 2
FIG. 3
FIG. 5

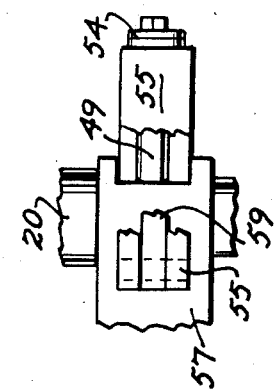
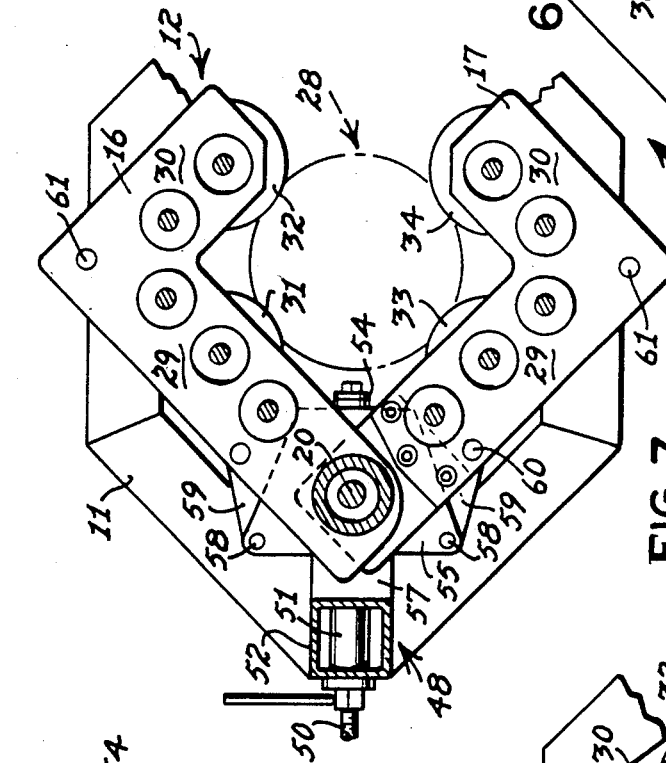
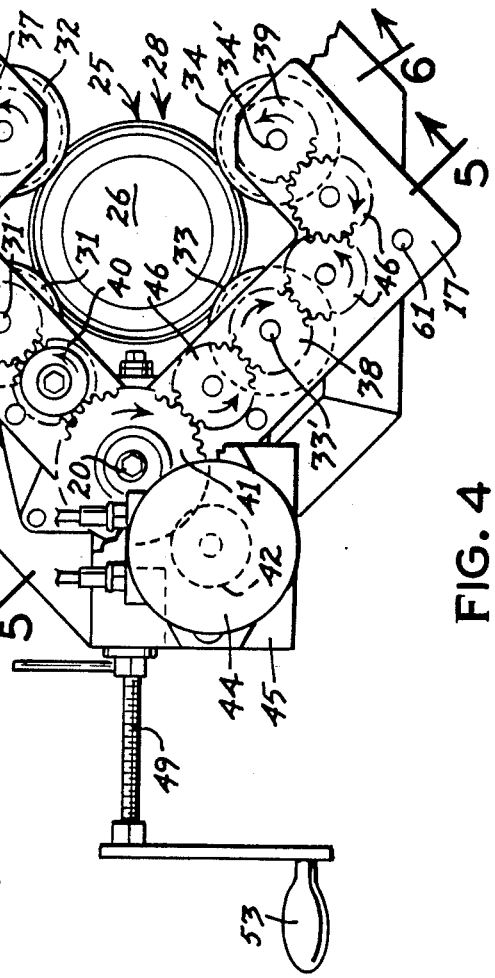
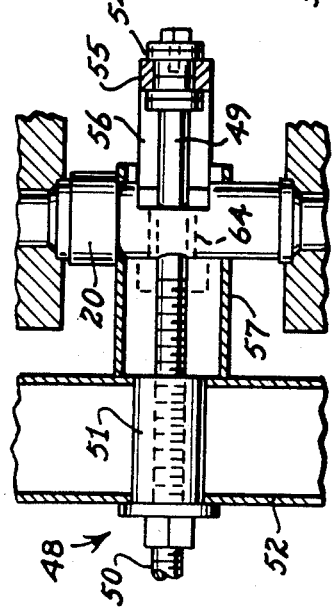
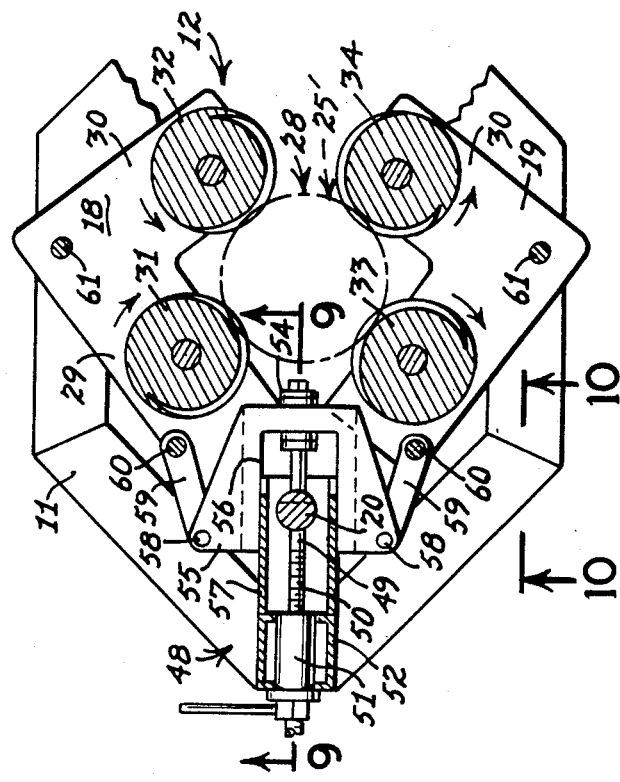

POT DISPENSING APPARATUS

BACKGROUND OF THE INVENTION

This invention relates to an apparatus for dispensing pots from a stack of pots, and more particularly to an apparatus which can dispense pots of different diameters.

The dispensing of frusto-conical containers by separating and dropping the lowermost container from a stack of like containers with a plurality of feed cylinders incorporating spiral grooves in their surfaces for engaging the rims or ledges of the containers, is well known in the art as shown by the following patents:

U.S. PATENTS

U.S. Pat. No. 806,359—A. H. Neureuther—Dec. 5, 1905

U.S. Pat. No. 1,634,566—E. G. Wessman—July 5, 1927

U.S. Pat. No. 2,433,736—H. Carew—Dec. 30, 1947

U.S. Pat. No. 2,497,718—R. W. Earley, et al—Feb. 14, 1950

U.S. Pat. No. 2,556,740—S. D. Polsen, et al—June 12, 1951

U.S. Pat. No. 2,830,627—S. D. Polsen, et al—Apr. 15, 1958

U.S. Pat. No. 2,946,481—H. Carew—July 26, 1960

U.S. Pat. No. 3,192,565—F. Rukavina—July 6, 1965

U.S. Pat. No. 3,323,856—G. A. Guckel—June 6, 1967

U.S. Pat. No. 3,426,941—J. C. Hovekamp—Feb. 11, 1969

U.S. Pat. No. 3,712,483—C. H. Messervey—Jan. 23, 1973

U.S. Pat. No. 3,862,702—D. O. Johnson, et al—Jan. 28, 1975

U.S. Pat. No. 4,426,017—L. A. Ficken, et al—Jan. 17, 1984

FOREIGN PATENTS

German Pat. No. 2740921—Sept. 9, 1977

The Wessman U.S. Pat. No. 1,634,566 and the German Pat. No. 2740921, disclose feed cylinders having spiral grooves whose pitch gradually increases in the downward direction.

The Johnnson U.S. Pat. No. 3,862,702, discloses feed cylinders or dispensing worms 18, which are mounted on swinging or pivot arms 22, pivotally mounted on drive shafts 24. The dispensing worms 17 are driven by meshing gears 30, 32 and 34. However, in the Johnson et al, patent, the worms 18 are biased into engagement with the lips of the cups C by a garter spring 42. The rotary cams 36 are adapted to move the dispensing worms 18 away from the cups on each revolution of the cam 36 to accommodate cups of larger and irregular size.

Several of the patents, such as Earley et al, U.S. Pat. No. 2,497,718, disclose a cup sensing switch 47 (Col. 3, lines 47-62).

In the Carew U.S. Pat. No. 2,946,481 the dispensing of different size cups is provided for by moving the dispensing worms to different series of apertures 27, 28 and 29 (FIG. 1).

Hovekamp, Messervey and Ficken et al, disclose various pivotal arm and cam arrangements for changing the size of the feed opening.

However, none of the above patents disclose an apparatus for dispensing frusto-conical containers, such as nursery or plant pots, incorporating a pair of pivotal jaws supporting the rotary feed cylinders having spiral grooves which may be swung toward and away from each other to grip and feed stacks of pots of different diameters.

SUMMARY OF THE INVENTION

It is therefore an object of this invention to provide an apparatus for dispensing frusto-conical containers, and particularly plant or nursery pots from a vertical stack of like pots of different diameters.

The pot dispensing apparatus made in accordance with this invention includes a pair of pivotal arm or jaw members adapted to support a plurality of feed cylinders having spiral grooves, for rotary movement about vertical axes, on opposite sides of a stack of pots. The surfaces of the feed cylinders, and particularly the spiral grooves, engage the rims or flanges of the frusto-conical pots for positive downward feeding and gradual separation from upper like pots for depositing the lowermost pot at a lower deposit station.

The arm members supporting the feed cylinders extend in a direction to at least partially surround a stack of pots to be dispensed so that at least two feed cylinders may easily be positioned in engagement with each opposite side of the stack regardless of the diameter of the stacked pots.

In a preferred form of the invention, each arm member is arcuate or angular to form angular legs, each leg supporting a feed cylinder for rotation. Each arm member preferably includes a pair of vertically spaced arms or arm members of identical construction between which are journaled the corresponding feed cylinders. An actuator mechanism is pivotally connected to the arm members for swinging the arm members toward and away from each other about a common pivot point.

In a preferred form of the invention, an overhead conveyor feeds stacks of pots to the dispensing station where each stack drops from the conveyor into its dispensing position between the arm members and the feed cylinders for positive downward feeding and separation.

Preferably, an actuator or limit switch is placed opposite the conveyor for engagement with a stack of pots in the dispensing position in order to de-energize the drive for the conveyor, and to re-energize the conveyor drive when the dispensing station is empty.

The drive mechanism for the feed cylinders includes transmission elements mounted on both arm members for continually driving the feed cylinders regardless of the pivotal position of the arm members.

The pitch of the spiral groove in the corresponding feed cylinders gradually increases downward so that as the pots are positively fed downward they are also separated from the upper pots so that only one pot at a time is dispensed.

BRIEF DESCRIPTION OF THE DRAWING

FIG. 2 is a top plan view of the apparatus disclosed in FIG. 1;

FIG. 3 is an enlarged fragmentary side elevation of the dispensing mechanism, with portions broken away;

FIG. 4 is a top plan view of the dispensing mechanism disclosed in FIG. 3, with portions of the frame broken away;

FIG. 5 is an enlarged section taken along the line 5—5 of FIG. 4;

FIG. 6 is an enlarged fragmentary section taken along the line 6—6 of FIG. 4;

FIG. 7 is a plan section taken along the line 7—7 of FIG. 3;

FIG. 8 is a horizontal section taken along the line 8—8 of FIG. 3, but showing the arm members in a contracted position for supporting a stack of pots of smaller diameter;

FIG. 9 is an enlarged fragmentary section taken along the line 9—9 of FIG. 8; and FIG. 10 is an enlarged fragmentary section taken along the line 10—10 of FIG. 8, with portions taken away.

DESCRIPTION OF THE PREFERRED EMBODIMENT

Figure 1:
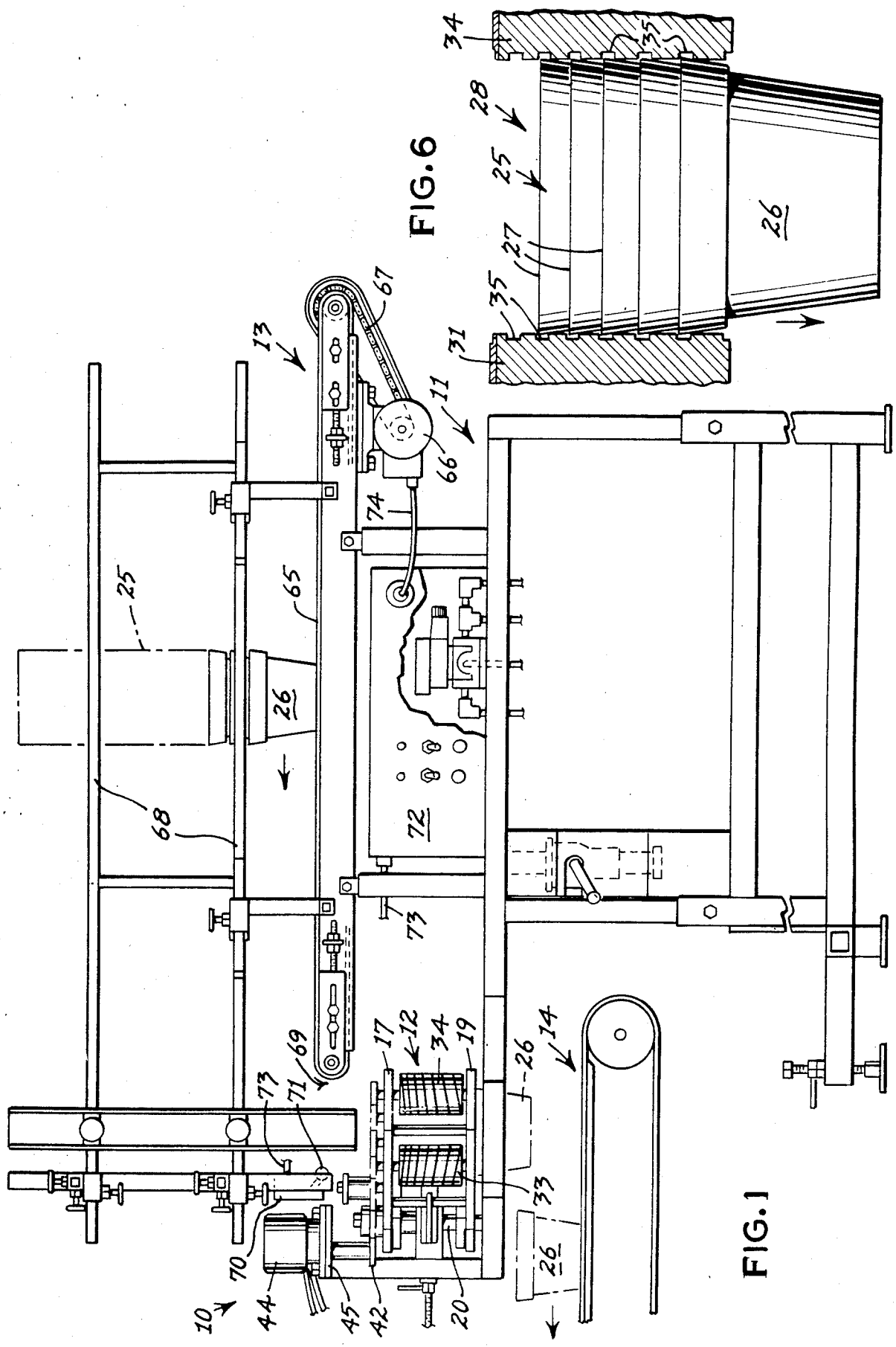
FIG. 1 is a side elevation of the apparatus made in accordance with this invention.

Referring now to the drawings in more detail, FIG. 1 discloses a pot dispensing apparatus 10, made in accordance with this invention, including a supporting frame 11, a pot dispensing mechanism 12, an overhead supply conveyor 14 and a deposit station or conveyor 14.

The pot dispenser mechanism 12 includes a pair of upper arm members, arms, or jaw members 16 and 17 and a pair of lower arm members, arms or jaw members 18 and 19 vertically below the corresponding upper arm members 16 and 17, pivotally mounted on vertical pivot post 20. The proximal end portions 21 and 22 of the upper arm members 16 and 17 overlap each other and are journaled in coaxial relationship upon the upper portion of the post 20. In like manner, the proximal end portions 23 and 24 of the lower arm members 18 and 19 overlap each other and are journaled in coaxial relationship upon the lower end portion of the post 20, as best disclosed in FIG. 5. The arm members pairs 16–17 and 18–19 are journaled upon the post 20 for free pivotal or swinging movement toward and away from each other on opposite sides of a vertical stack 25 of frusto-conical plant pots 26 having their largest diametrical dimension at the upper edge in the form of a rim or flange 27, in a dispensing station or position 28 having a vertical dispensing axis. Each of the arm members 16–19 is long enough to extend from the pivotal axis of the post 20 beyond the transverse mid-point of the largest stack 25 of pots 26. Each of the arm members 16–19 is preferably of an arcuate or angular structure generally surrounding the stack dispensing position 28, as illustrated in FIGS. 4, 7 and 8. As disclosed in the drawings, each of the arm members 16–19 is angular, and specifically L-shaped, each arm member including a proximal leg 29 and a remote leg 30.

The upper arm member 16 is preferably of identical construction and spaced vertically above its corresponding lower arm member 18, while the upper arm member 17 is of identical construction and spaced vertically above its corresponding lower arm member 19. The vertical spacing between the arm members 16 and 18 is the same as the vertical spacing between the arm members 17 and 19.

Supported between the vertically spaced sets or pairs of arm members 16–18 and 17–19 are a plurality of vertical feed cylinders 31, 32, 33 and 34. The cylinders 31 and 32 are supported by the proximal and remote legs of the arm members 16–18, respectively, while the feed cylinders 33 and 34 are supported by the respective proximal and remote legs 29 and 30 of the vertically spaced arm members 17 and 19.

Each of the feed cylinders 31–34 includes a spiral groove 35 formed in its outer surface. The spiral grooves 35 of the proximal cylinders 31 and 33 spiral in the same direction, while the spiral grooves 35 in the remote feed cylinders 32 and 34 spiral in the same direction as each other, but in opposite directions to the spiral grooves in the proximal feed cylinders 31 and 33. The spiral grooves 35 of all four of the cylinders 31–34 are of substantially the same construction and have the same pitch, which increases gradually downward. The function of the spiral grooves 35 is to engage the flanges or upper rims 27 of the corresponding plant pots 26 in a stack 25 within the dispensing station or position 28. The feed cylinders 31–34 are driven in directions which cause the spiral gooves 35 to positively move the pots 26 downward. Because of the downward increasing pitch of the spiral grooves 35, the lowermost plant pots 26 are gradually separated from the pots 26 immediately above, and the lowermost pot 26, being completely separated, drops independently from the stack 25 to a deposit station, such as the conveyor 14.

Each feed cylinder 31–34 is fixed to a corresponding cylinder shaft $31^1$, $32^1$, $33^1$, and $34^1$, respectively, which are journaled in the corresponding arm members 16–19. The upper end portion of each cylinder shaft $31^1$–$34^1$ carries a spur gear 36, 37, 38 and 39, respectively. The spur gears 36 and 37 operatively mesh or interdigitate with the idler gears 40 to form a gear train, which is driven by driven gear 41 fixed to the upper end portion of the pivot post 20. The drive no gear 41 meshes with the drive gear 42 driven by the feed motor 44, which is supported on platform 45 the frame 11. In like manner, the cylinder spur gears 38 and 39 mesh or interdigitate with the idler gears 46 to form a gear train driven by the driven gear 41.

Thus, when the feed motor 42 is energized, the driven gear 41 drives both sets of gear trains on the respective arm members 16 and 17 to simultanzeously drive the feed cylinders 31–34 in the direction of the arrows illustrated in FIG. 4. The spiral grooves 35 rotate in a direction to move the pots 26 downward as the grooves 35 engage the largest part of the diameter of each pot, which in the drawings would be the upper rim 27.

FIG. 6 illustrates how the lower pots 26 are gradually separated from the upper pots as the feed cylinders 31–34 rotate in directions to move the engaging portions of the spiral grooves 35 downward.

Since the driven spur gear 41 is rotatably mounted coaxially upon the pivot post 20, it is in constant engagement with the adjacent spur gears 40 and 46 of the gear trains on the corresponding arm members 16 and 17.

The relative pivotal positions of the arm members 16 and 17 is controlled by an actuator mechanism 48. The actuator mechanism 48 includes an elongated actuator rod 49 having an externally threaded portion 50 which extends through the internally threaded nut member 51 fixed in an upright post 52 supported on a portion of the frame 11. The outer or proximal end portion of the actuator rod 49 is provided with a crank handle 53 for rotating the actuator rod 49 for advancement or retraction within the nut member 51.

The remote end portion of the actuator rod 49 extends through a slot 64 (FIGS. 5 and 9) within the vertical pivot post 20. The remote end of the actuator rod 49 terminates in a connector member 54 which connects the rod 49 to a yoke 55. The yoke 55 is provided with a guide slot 56 which permits it to be slidably and reciprocably guided over the guide stem 57 projecting from the fixed post 52. Pivotally mounted to each side of the yoke 55 by pivot pins 58 are a pair of link arms 59 pivotally connected at their opposite ends upon vertical rods 60 extending between and fixed to the respective arm member pairs 16-18 and 17-19. The pivot rods 60 also function as spacer rods between their corresponding arm members. Other spacer rods, such as 61, may also be incorporated to hold each pair of arm members 16-18 and 17-19 in their rigid vertically spaced positions relative to each other.

Thus, when the handle 43 is rotated in a direction to cause the actuator rod 49 to travel away from the dispensing station 28, the yoke 55 moving in the same direction causes the arm members 16-18 and 17-19, through the pivotal movement of the link arms 59, to move away from each other. When the handle 53 is rotated in the reverse direction, the actuator rod 49 travels toward the dispensing station 28 to cause the pairs of arm member 16-18 and 17-19 to move toward each other to accommodate a stack 25 of pots 26 of smaller diameter. It will be noted in FIG. 8 that the stack 25[1] is of a small diameter than the stack 25 illustrated in FIGS. 4 and 7 and that the arm members in FIG. 8 have been contracted toward each other relative to their positions in FIGS. 4 and 7.

In order to supply the pot dispenser mechanism 12 with pots 26, the overhead conveyor 13 is mounted on the frame 11 to feed stacks 25 to a position directly above the dispensing position 28 within the dispenser mechanism 12. The overhead conveyor 13 includes an elongated endless conveyor belt 65 driven by a conveyor motor 66 through a sprocket and chain transmission 67. Both sides of the space above the conveyor belt 65 may be provided with guide frames 68 of any desired construction, to guide and to retain the stacks 25 upon the conveyor belt 65. The leading end portion 69 of the conveyor belt 65 is located immediately adjacent the dispensing station or dispensing position 28 determined by the spacing of the arm members 16 and 17 and between the corresponding spiral feed cylinders 31-34 the stack 25 is engaged by the spiral surfaces of the feed cylinders for positive downward feeding of the corresponding pots 26.

In a preferred form of the invention, an actuator or limit switch 70 is located on the opposite side of the dispensing station 28 from the leading end portion 69 of the belt 65 so that the switch finger 71 is engaged and depressed by a stack 25 occupying the dispensing position. When the switch finger 71 is depressed, the conveyor motor 66 is de-energized through an appropriate electrical circuit and controls within the control cabinet 72. Furthermore, when no pots 26 are in the dispensing station 28 and do not engage the switch finger 71, the retracted switch finger 71 will actuate the controls within the cabinet 72 in order to re-energize the motor 66 to feed more stacks 25 toward the dispensing station. The actuator switch 70 may be connected to the controls within the cabinet 72 by the electrical lead or line 73. The motor 66 is connected to the controls within the cabinet 72 through line 74.

The operation of the pot dispensing apparatus 10 is apparent from the above description.

In a nursery operation, plant pots 26 are arranged in stacks 25 and positioned upon the conveyor 65. If no pots 26 are in the dispensing station 28, the conveyor motor 66 is energized to drive the belt 65 and move the stacks 25 toward the left of FIG. 1 until a stack 25 is deposited into the dispensing station 28. In its dispensing position, the stack 25 engages the switch finger 71 to de-energize the conveyor motor 26.

The feed motor 44 is energized to drive the driven gear 41 and its corresponding gear trains 36, 37, 40, and 38, 39, and 46 to rotate the feed cylinders 31-34 in the respective directions illustrated by the arrows in FIG. 4 so that the spiral grooves 35 will engage and positively feed downward the plant pots 26. Since the spiral grooves 35 have downward increasing pitches, the pots 26 are gradually separated from the pots immediately above them until the lowermmost pot 26, as best illustrated in FIG. 6, is completely separated from the pot immediately above it and after disengagement from the lowermost spiral groove 35 drops by gravity upon the deposit conveyor 14 or other deposit station.

Each pot 26 is then ready, in a nursery operation, to be filled with the roots of a plant, shrub or tree and the desired soil material, such as peat moss, or compost, mixed with nutrients, and/or insecticides, if desired.

The apparatus 10 is designed to feed and separate the pots 26 from a stack 25 even when the pots 26 are of differents dismeters from pots in other stacks. After the pot size is identified by the operator, he turns the crank handle 53 in a direction to swing the corresponding arm members 16-18 and 17-19 toward or away from each other until the feed cylinders 31-34 are in a proper relative dispensing position 28 to tangentially engage the circumference of the largest diameter of the pot 26 in a corresponding stack 25.

The linear actuator rod 49 may be driven by power means, not shown, instead of the manual handle 53, in order to relatively swing the respective arm members 16-19. Moreover, appropriate gauges may be provided on the actuator mechanism 48 for visually indicating the proper adjustment of the actuator mechanism 48 relative to the pot size. The threaded portion 50 and the internally threaded nut member 51 provide very fine adjustments for the relative pivotal or swinging positions of the arm members 16-19 for accommodating pots 26 of different sizes in the dispensing station 28.

What is claimed is:

1. An apparatus for dispensing a frusto-conical pot, having an upper rim, from a stack of like pots, comprising:
    (a) a dispensing station having a vertical dispensing axis,
    (b) first and second arm members, each arm member having a proximal end portion and a remote end portion,
    (c) journal means pivotally connecting said proximal end portions for swinging movement of said arm members in a horizontal plane on opposite sides of said dispensing axis,
    (d) a plurality of first feed cylinders having vertical cylindrical axes mounted on said first arm member for rotary movement about their respective cylindrical axes,
    (e) a plurality of second feed cylinders having vertical cylindrical axes mounted on said second arm member for rotary movement about their respective cylindrical axes,
    (f) each of said feed cylinders having a spiral groove in its outer cylindrical surface,
    (g) said feed cylinders being arranged on said arm members in a dispensing position around a stack of pots in said dispensing station coaxial with said dispensing axis and engaging the rims of the pots in said stack, (h) drive means on said arm members for rotating said feed cylinders in corresponding directions to cause said spiral grooves to engage the rims of said pots in said stack in said dispensing position to move the pots downward and to separate the lowermost pot from said stack, (i) actuator means comprising an actuator member, means supporting said actuator member for movement in a predetermined direction, and means operatively connecting said actuator member to said first and second arm members, and (j) operator means for moving said actuator member in said predetermined direction to cause said arm members to swing toward and away each from other to different dispensing positions for dispensing pots of different diameters.

2. The invention according to claim 1 in which said spiral grooves increase in pitch downward in order to positively separate the lowermost pot in a stack from the pot immediately above the lowermost pot.

3. The invention according to claim 2 in which each pot engaged by said circumferential spiral grooves travels downward farther than the pot immediately above said pot for each revolution of said corresponding feed cylinders.

4. The invention according to claim 1 in which said actuator member comprises a linear member, said supporting means supporting said linear member for linear reciprocal movement, and said connecting means comprising link means operatively connecting said linear member to said first and second arm members.

5. The invention according to claim 4 in which said linear member comprises a yoke, said link means comprising first and second link bars, one end of said link bars being pivotally connected to said yoke and the other ends of said link bars being pivotally connected to said first and second arm members, respectively.

6. The invention according to claim 4 further comprising a frame, said journal means being mounted on said frame, said linear member being externally threaded, an internally threaded nut member on said frame threadedly receiving said linear member, said operator means comprising means for turning said threaded linear member for reciprocable travel relative to said nut member.

7. The invention according to claim 1 in which said drive means comprises a drive motor and transmission means operatively connecting said drive motor to said feed cylinders.

8. The invention according to claim 7 in which said transmission means comprises a plurality of intermeshing spur gears journaled for rotation on said arm members, each of said feed cylinders being fixed to a vertical rotary shaft journaled in said corresponding arm member, each of said rotary shafts supporting one of said spur gears.

9. The invention according to claim 1 further comprising an elongated conveyor having a leading end portion, said leading end portion terminating adjacent said dispensing station, said conveyor being adapted to support a stack of pots, conveyor drive means for driving said conveyor to move said stack of pots toward said leading end portion and for depositing said stack into said dispensing station between said feed cylinders, an actuator switch adjacent said dispensing station opposing the leading end portion of said conveyor, said actuator switch being adapted to be engaged by a stack of pots in said dispensing station for de-energizing said conveyor drive means, said actuator switch being adapted, when not engaged by said stack of pots, to re-energize said conveyor drive for feeding another stack of pots to said dispensing station.

* * * * *